(12) United States Patent
Kuribayashi et al.

(10) Patent No.: US 9,435,445 B2
(45) Date of Patent: Sep. 6, 2016

(54) NORMALLY CLOSED THREE-PORT VALVE

(71) Applicant: SMC CORPORATION, Chiyoda-ku (JP)

(72) Inventors: Akira Kuribayashi, Meguro-ku (JP); Hitoshi Yamamoto, Shimotsuma (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/439,029

(22) PCT Filed: Oct. 30, 2012

(86) PCT No.: PCT/JP2012/077967
§ 371 (c)(1),
(2) Date: Apr. 28, 2015

(87) PCT Pub. No.: WO2014/068652
PCT Pub. Date: May 8, 2014

(65) Prior Publication Data
US 2015/0292632 A1 Oct. 15, 2015

(51) Int. Cl.
*F16K 25/00* (2006.01)
*F16K 11/06* (2006.01)
(Continued)

(52) U.S. Cl.
CPC .............. *F16K 11/06* (2013.01); *F16K 1/36* (2013.01); *F16K 11/04* (2013.01); *F16K 39/02* (2013.01)

(58) Field of Classification Search
CPC .......... F16K 11/06; F16K 11/04; F16K 1/36; F16K 39/02; Y10T 137/87233; Y10T 137/87241
USPC ............ 137/596.1, 596.2; 277/598; 251/214, 251/282, 329, 332, 363, 366
See application file for complete search history.

(56) References Cited

U.S. PATENT DOCUMENTS 2,534,509 A * 12/1950 Franck .................. F16K 11/044
137/596.1
2,593,740 A * 4/1952 Faust ........................ F16K 1/36
251/332
(Continued)

FOREIGN PATENT DOCUMENTS

CN 1734143 A 2/2006
CN 101551026 A 10/2009
(Continued)

OTHER PUBLICATIONS

Combined Office Action and Search Report issued Feb. 3, 2016 in Chinese Patent Application No. 201280076754.4 (submitting English translation of Search Report only).
(Continued)

*Primary Examiner* — Kevin Murphy
*Assistant Examiner* — Minh Le
(74) *Attorney, Agent, or Firm* — Oblon, McClelland, Maier & Neustadt, L.L.P

(57) ABSTRACT

A normally closed three-port valve includes a valve member urged from a supply port side toward a main valve seat of a valve body in a valve closing direction and opened by a valve opening rod having a discharge channel. A back pressure chamber at a back of the valve member communicates with a channel on an output port side through a vent hole balancing fluid pressures acting on front and back surfaces of the valve member. The valve member includes a main body, a seat member, a securing member, and a pressing frame The seat member includes an elastic discoid sealing member, main and discharge seat surfaces, and communication holes open at a region between the main and discharge seat surfaces forming the vent hole. The securing member secures the seat member to the valve member main body. The pressing frame is at the circumference of the seat member.

5 Claims, 5 Drawing Sheets

(51) Int. Cl.
*F16K 39/02* (2006.01)
*F16K 1/36* (2006.01)
*F16K 11/04* (2006.01)

(56) References Cited

U.S. PATENT DOCUMENTS

| | | | | |
|---|---|---|---|---|
| 2,880,754 | A * | 4/1959 | Williams | F16K 35/14 |
| | | | | 137/596.1 |
| 2,896,665 | A * | 7/1959 | Lieser | F16K 24/04 |
| | | | | 137/596.1 |
| 2,985,490 | A * | 5/1961 | Gates | B60T 15/18 |
| | | | | 137/102 |
| 2,999,513 | A * | 9/1961 | Oetiker | F16K 11/02 |
| | | | | 137/596.1 |
| 3,071,147 | A * | 1/1963 | Dudzinski | F16K 31/0624 |
| | | | | 137/116.5 |
| 3,507,545 | A * | 4/1970 | Page | B60T 15/046 |
| | | | | 137/115.16 |
| 3,768,877 | A * | 10/1973 | Siebold | B60T 15/046 |
| | | | | 303/52 |
| 4,038,999 | A * | 8/1977 | Hayashida | B60T 13/141 |
| | | | | 137/116.3 |
| 4,077,674 | A * | 3/1978 | Doto | B60T 15/028 |
| | | | | 137/627.5 |
| 4,098,171 | A * | 7/1978 | Haytayan | B25D 9/16 |
| | | | | 251/357 |
| 4,499,921 | A * | 2/1985 | Stoll | F16K 11/02 |
| | | | | 137/214 |
| 6,213,448 | B1 * | 4/2001 | Hayakawa | F16K 1/36 |
| | | | | 251/129.15 |
| 7,523,763 | B2 | 4/2009 | Katsuta et al. | |
| 7,543,603 | B2 * | 6/2009 | Wang | F15B 13/0405 |
| | | | | 137/596.16 |
| 8,157,243 | B2 * | 4/2012 | Wech | B29C 45/14344 |
| | | | | 137/528 |
| 2005/0023496 | A1 * | 2/2005 | Foster | F16K 1/46 |
| | | | | 251/191 |
| 2012/0145252 | A1 | 6/2012 | Hunnicutt | |
| 2015/0083257 | A1 * | 3/2015 | Shiota | F25B 41/062 |
| | | | | 137/625.48 |

FOREIGN PATENT DOCUMENTS

| | | |
|---|---|---|
| CN | 202203442 U | 4/2012 |
| GB | 2035515 A | 6/1980 |
| JP | 55-97584 A | 7/1980 |
| JP | 2001-336652 A | 12/2001 |

OTHER PUBLICATIONS

International Search Report issued Jan. 15, 2013 in PCT/JP2012/077967 filed Oct. 30, 2012.

* cited by examiner

NORMALLY CLOSED THREE-PORT VALVE

TECHNICAL FIELD

The present invention relates to normally closed three-port valves, and in particular, relates to improvement of a normally closed three-port valve equipped with a balancing mechanism that reduces an operating force for closing a valve of a valve member at a valve open position.

BACKGROUND ART

A known related-art normally closed three-port valve equipped with the above-described balancing mechanism includes a valve body having a basic structure similar to the three-port valve according to the present invention. In this related-art normally closed three-port valve, a pressure of a fluid having flowed to an output port side when a valve was opened by pressing a rod for operating a valve member is caused to operate as a back pressure for closing the valve applied to the valve member.

In the case of a normally closed three-port valve without the balancing mechanism, the pressure of the fluid having flowed to the output port side when the valve was opened by pressing the valve member with the rod operates as a force in a direction in which the valve member is held at the valve open position. Thus, even when a pressing force for opening the valve applied to the valve opening rod is lost, the valve is not closed until a valve closing force against the pressure of the fluid having flowed to the output port side acts on the valve member. For example, it is required that the valve closing force be applied by a return spring for the valve member or a mechanism that forcibly closes the valve be provided. When the valve closing force is caused to act on the valve member by the return spring, in order to open the valve, it is required that the valve be opened against an urging force of the return spring and the pressure of a main fluid. Accordingly, in order to open the valve, a large operating force is required to be applied to the rod.

In order to reduce the operating force for open the valve, the balancing mechanism balances the fluid pressures acting on the front and back surfaces of the valve member by causing the pressure of the main fluid on the output port side to flow into a back pressure chamber formed at the back of the valve member through a vent hole provided in the valve member when the valve member is at the valve open position. In order to open the valve, it is required that a discharge channel open to the outside through the rod be closed, and at the same time, the main valve seat be opened by the valve member, and the vent hole of the valve member for causing the pressure of the main fluid on the output port side to flow into the back pressure chamber be held in a state in which the vent hole is open to the output port side. This three-port valve, which is typically closed by a return spring applying a small urging force acting on the valve member, is closed by releasing the pressure applied to the valve member by the rod, and at the same time, opening the discharge channel open to the outside through the rod.

Thus, a known normally closed three-port valve typically uses a valve member 40 having a structure as illustrated in FIG. 8. In use, this valve member 40 is attached to a valve body 1 having a structure similar to a normally closed three-port valve illustrated in FIG. 1. A valve member main body 41 faces a main valve seat 2 of the valve body 1 and is airtightly held such that the valve member main body 41 is slidable in a contacting and separating direction. The valve member main body 41 has a main seat surface 44 and a discharge seat surface 45. The main seat surface 44 is brought into contact with and separated from the main valve seat 2 of the valve body 1. The discharge seat surface 45 is brought into pressure contact with an inner end of a discharge channel 6 of the valve opening rod 5 so as to close the discharge channel 6. It is originally preferable that the discharge seat surface 45 be disposed at a position immediately adjacent to the main seat surface 44 around the main seat surface 44. However, since the vent hole that communicates with the back pressure chamber 8 is required to open at a region between both the seat surfaces, both the main seat surface 44 and the discharge seat surface 45 cannot be provided on the same plane. Thus, a level difference 42 is provided on an upper portion of the valve member main body 41, and the main seat surface 44 is provided on a lower level and the discharge seat surface 45 is provided on an upper level. This allows the vent hole to be open in the level difference 42, and accordingly, the fluid can stably flow and be blocked by both the seat surface portions 44 and 45.

However, when the above-described structure is adopted, it is difficult to independently stably secure the main seat surface 44 and the discharge seat surface 45 to the valve member main body 41 after the main seat surface 44 and the discharge seat surface 45 have been formed as independent seat members in the manufacture of the valve member 40. Accordingly, it is required that, as a single rubber lining formed of a seat member having rubber elasticity, a seat member 43 that extends through the upper and lower levels of the level difference 42 be provided in the valve member main body 41. It is also required that, in order to open the vent hole at a side surface portion of the level difference 42, a vent hole 46, which does not reach from a lower surface to an upper surface of the valve member main body 41, and a branched vent hole 47, through which an upper portion of the vent hole 46 is open to the side surface, be formed. Thus, it is difficult to make the valve member main body 41 by molding, and accordingly, it is required that a structure for lining the seat member 43, the vent hole 46, and the branched vent hole 47 be formed by cutting a metal material. Furthermore, the valve member main body 41 is required to be separately lined with rubber. As a result, the manufacturing cost of the valve member becomes comparatively high.

SUMMARY OF INVENTION

Technical Problem

A technical task of the present invention is to form a valve member so as to have a connecting structure of components which can be formed of molded products that can be easily formed and assembled, thereby providing a normally closed three-port valve including the valve member produced at a reduced cost.

Solution to Problem

In order to achieve the above described task, according to the present invention, a normally closed three-port valve is provided as follows. That is, the normally closed three-port valve includes a valve member urged in a valve closing direction by a return spring from a supply port side toward a main valve seat provided between an output port and the supply port in a valve body. The valve member is subjected to a valve opening operating force applied by a valve opening rod having a discharge channel, which is closed when the discharge channel is brought into contact with a discharge seat surface on the valve member, so as to open a main valve seat. The normally closed three-port valve has a balancing mechanism that balances fluid pressures acting on front and back surfaces of the valve member with a vent hole, which is provided in the valve member and which allows a back pressure chamber formed at a back of the valve member to communicate with a channel for a main fluid on the output port side when the valve member is at a valve open position. The valve member includes a valve member main body, a seat member, a securing member, and a pressing frame. The valve member main body is held such that the valve member main body is slidable relative to the main valve seat in a contacting and separating direction. The valve member main body has a through hole formed therein to form the vent hole. The seat member is formed of a discoid sealing member having rubber elasticity and brought into contact with a main valve seat facing surface of the valve member main body. The seat member has a main seat surface formed at a portion facing the main valve seat, the discharge seat surface formed at a portion facing an end surface of the discharge channel of the valve opening rod, and a communication hole allowing the through hole of the valve member main body to be open at a region between the discharge seat surface and the discharge seat surface. The securing member is airtightly fitted into a central portion of the seat member so that a tip end thereof is locked by the valve member main body so as to secure the seat member to the valve member main body. The pressing frame holds a circumference of the seat member on the valve member main body. The valve member main body, the seat member, the securing member, and the pressing frame of the valve member are formed by molding.

According to a preferred embodiment of the normally closed three-port valve according to the present invention, the pressing frame that holds the circumference of the seat member on the valve member main body has a locking edge portion, which is locked at the circumference of the seat member so as to clamp the seat member between the locking edge portion and the circumference of the valve member main body, and a circumferential edge lower portion of the pressing frame, which is in contact with a circumferential edge of the valve member main body, is secured to the valve member main body by welding or bonding.

According to another preferred embodiment of the present invention, a tip end the valve opening rod, the valve opening rod applying the valve opening operating force to the valve member, may project from the valve body to an outside, so that an outer end of the rod serves as a contacting end that is in mechanical contact with a valve operating mechanism.

Furthermore, according to a preferred embodiment of the present invention, the main valve seat facing surface of the valve member main body has a groove that allows the communication hole provided corresponding to the region between the main seat surface and the discharge seat surface of the seat member of the valve member to communicate with the through hole of the valve member main body, or the main valve seat facing surface of the valve member main body has a projection that is inserted into the communication hole provided corresponding to the region between the main seat surface and the discharge seat surface of the seat member of the valve member so as to position the seat member and suppress narrowing of the communication hole due to deformation.

Advantageous Effects of Invention

With the normally closed three-port valve having been described in detail above, the valve member can have the connecting structure of the components which can be formed of molded products that can be easily molded and assembled, and accordingly, the normally closed three-port valve including the valve member produced at a reduced cost can be provided.

DESCRIPTION OF EMBODIMENTS

Figure 1:
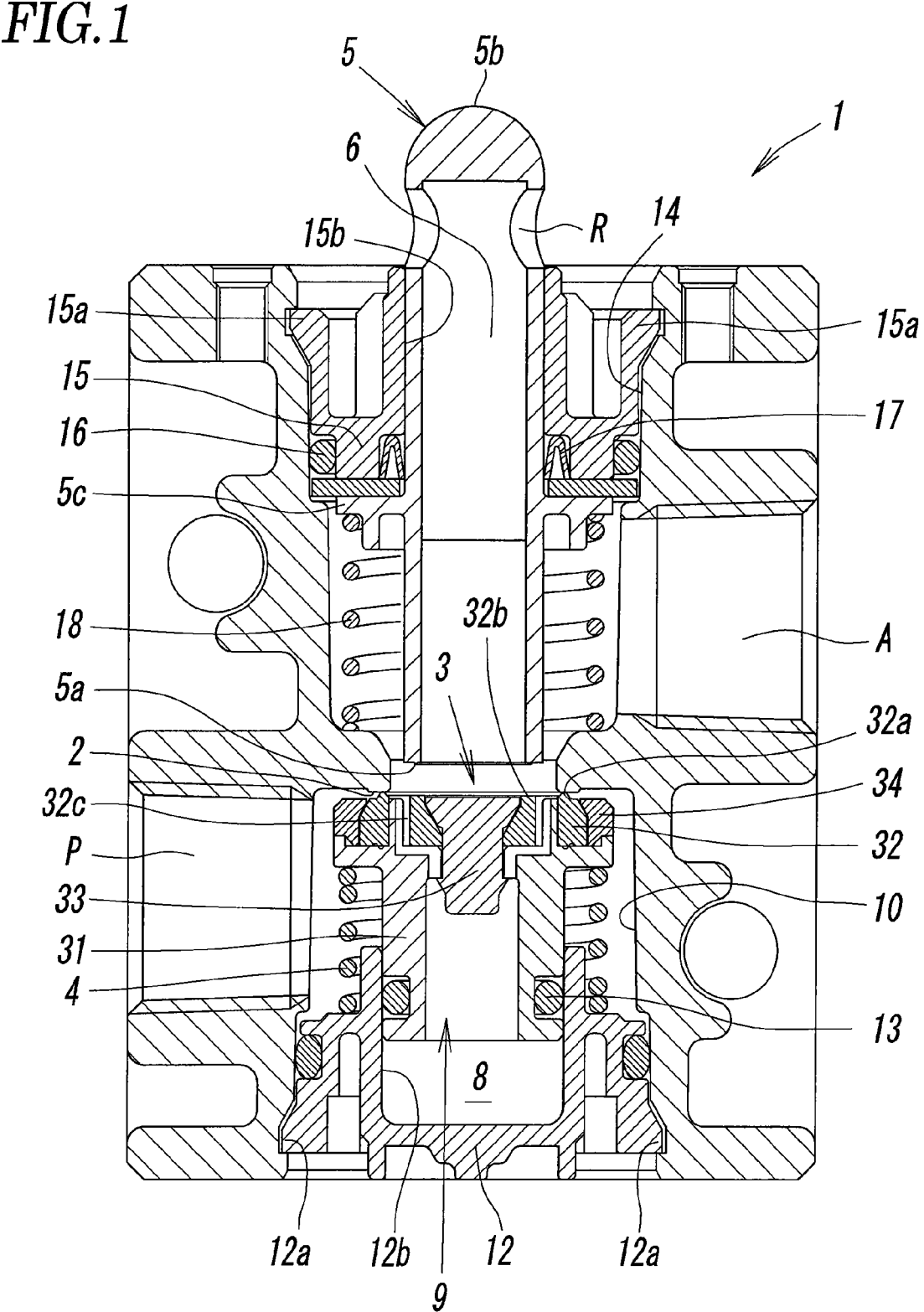
FIG. 1 is a longitudinal sectional view illustrating an example of an embodiment of a normally closed three-port valve according to the present invention.
Figure 2:
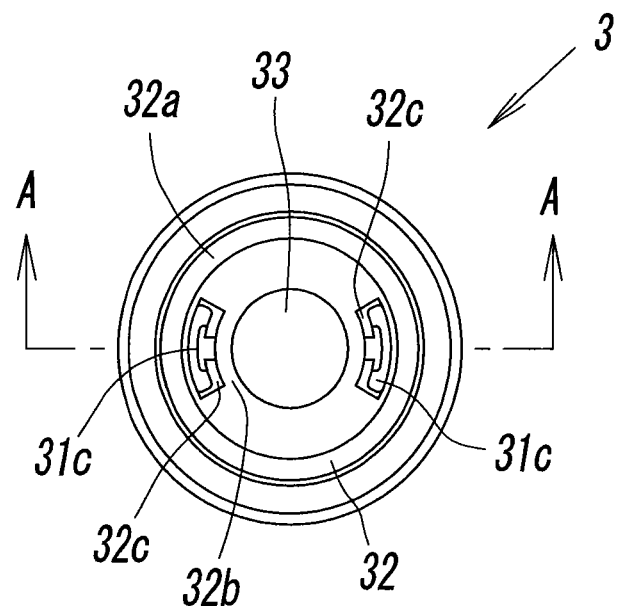
FIG. 2 is a plan view of a valve member of the normally closed three-port valve.
Figure 3:
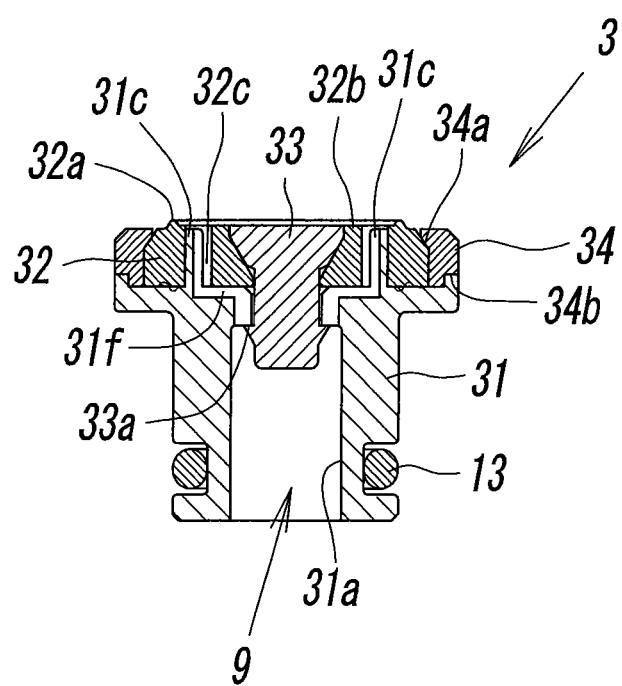
FIG. 3 is a sectional view of the valve member illustrated in FIG. 2 taken along a line A-A in FIG. 2.
Figure 4:
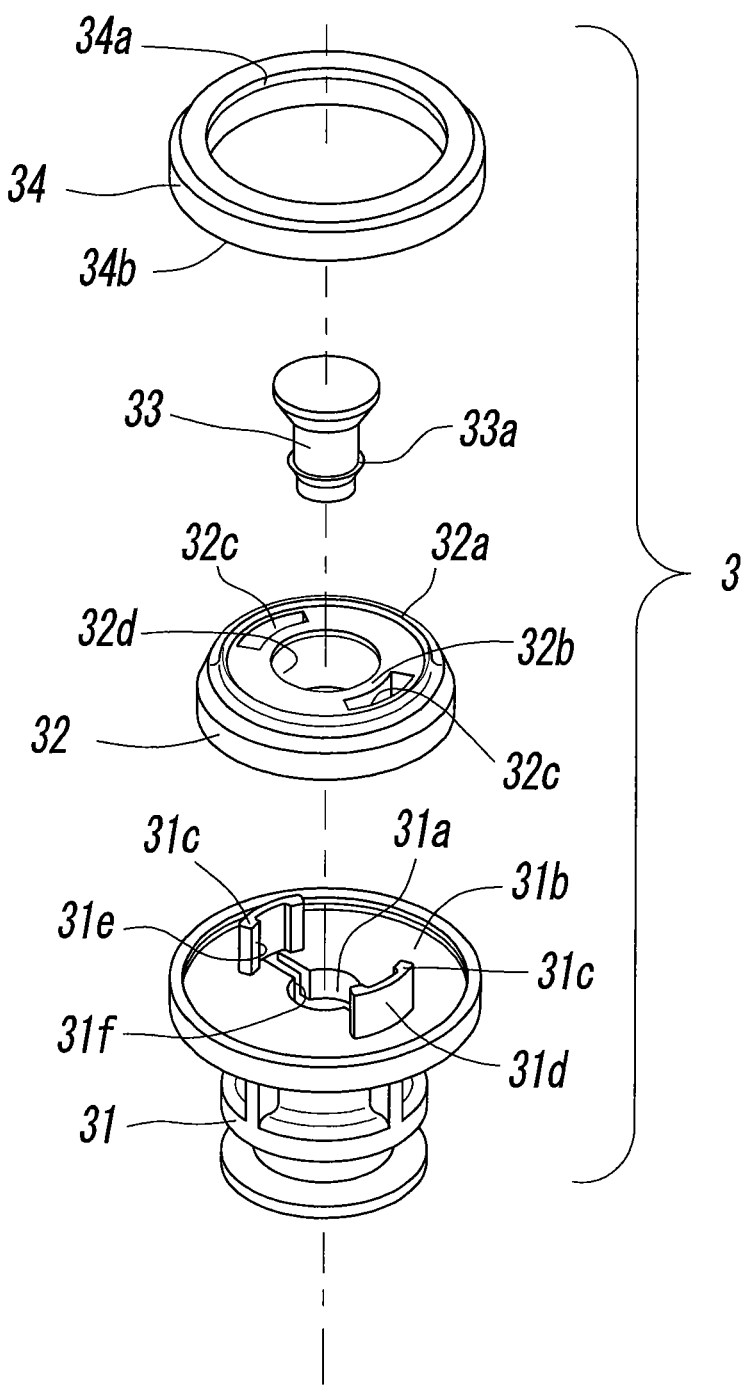
FIG. 4 is an exploded perspective view of the valve member.

FIG. 1 illustrates an example of an embodiment of a normally closed three-port valve according to the present invention. This normally closed three-port valve includes a valve member 3 that faces a main valve seat 2 provided in a channel between a supply port P and an output port A in a valve body 1. The valve member 3 is urged in a valve closing direction by a return spring 4 from the supply port P side. A valve opening rod 5 that applies a valve opening operating force to the valve member 3 so as to open the main valve seat 2 has a discharge channel 6 therein. The discharge channel 6 is closed when the valve opening rod 5 is brought into contact with the valve member 3. By bringing an inner end of the discharge channel 6 into contact with and separating from a seat member 32 of the valve member 3, the discharge channel 6 can be closed and opened. The seat member 32 of the valve member 3 will be described later. Furthermore, a vent hole 9 is provided in the valve member 3. The vent hole 9 allows a back pressure chamber 8 at the back of the valve member 3 to communicate with a main fluid channel on the output port A side when the valve member 3 is at a valve open position. Thus, a balancing mechanism that balances fluid pressures acting on the front and back surfaces of the valve member 3 is structured.

Although the vent hole 9 constantly allows the back pressure chamber 8 to communicate with the main fluid channel on the output port A side, the channel on the output port A side is open to the atmosphere in a valve close state as illustrated in FIG. 1. Thus, a pressure air is not introduced into the back pressure chamber 8.

The valve member 3 is disposed at a position where the valve member 3 faces the main valve seat 2 such that the valve member 3 is slidable in a contacting and separating direction in which the valve member 3 is brought into contact with or separated from the main valve seat 2. The valve member 3 is held as follows: a holding member 12, which has a claw portion 12a elastically locked by and secured to an inner surface of a valve hole 10 provided in the valve body 1, is fitted in the valve hole 10; and the valve member 3 is inserted into a cylinder portion 12*b* of the holding member 12 with a sealing member 13 interposed therebetween such that the valve member 3 is slidable in the contacting and separating direction in which the valve member 3 is brought into contact with or separated from the main valve seat 2. Thus, the back pressure chamber 8 is formed at the back of the valve member 3 in the cylinder portion 12*b*.

The valve member 3 is not necessarily held by the above-described holding member 12. The valve member 3 may be disposed in the valve body 1 or the like such that the valve member 3 is slidable in the contacting and separating direction relative to the main valve seat 2 on the supply port P side of the main valve seat 2.

The valve opening rod 5 is held such that the valve opening rod 5 is slidable in the axial direction of the valve member 3 relative to the valve body 1 and has, as described above, the discharge channel 6 therein. An end surface 5*a* of the valve opening rod 5 on the valve member 3 side forms a discharge valve portion, so that the discharge channel 6 is closed by contact of the valve opening rod 5 with the seat member 32 on the valve member 3. The other end of the valve opening rod 5 projects from the valve body 1 to the outside. An outer end of the valve opening rod 5 serves as a contact end 5*b* to be brought into mechanical contact with an operating portion of a valve operating mechanism as appropriate. An outer end of the discharge channel 6 is open at a portion outwardly projecting from the valve body 1 and serves as a discharge port R in a side surface of the rod 5. The outer end of the rod 5 can be operated as appropriate by an actuator included in the valve operating mechanism.

The rod 5 is held to the valve body 1 as follows: a rod holding member 15, which has a claw portion 15*a* elastically locked by and secured to an inner surface of a rod holding hole 14 provided in the valve body 1, is fitted; the rod 5 is slidably inserted into an inner cylindrical portion 15*b* of the rod holding member 15, and, in order to airtightly close the rod holding hole 14 open to a channel on the output port A side, gaps between the rod 5 and the valve body 1 are sealed by sealing members 16 and 17 held by the rod holding member 15. Furthermore, a rod return spring 18 is loaded between a spring receiving portion 5*c* formed in an outer circumference of the rod 5 and an inner surface of the valve body 1.

Next, the structure of the valve member 3 is described in detail with reference to FIGS. 1 to 4.

Initially, the valve member 3 includes a valve member main body 31, the seat member 32, a securing member 33, and a pressing frame 34. The valve member main body 31 is slidably held in the contacting and separating direction relative to the main valve seat 2 and has a through hole 31*a* therein for forming the vent hole 9. The seat member 32 is formed of a discoid sealing member having rubber elasticity and in contact with and held by a main valve seat facing surface 31*b* of the valve member main body 31. A securing member 33 is airtightly fitted into a central portion of the seat member 32 so that the tip portion thereof is locked by the through hole 31*a* of the valve member main body 31, thereby securing the seat member 32 to the valve member main body 31. A circumferential portion of the seat member 32 is held on the valve member main body 31 by the pressing frame 34.

The valve member main body 31, the securing member 33, and the pressing frame 34, which are components of the valve member 3, are formed by molding metal or synthetic resin, and the seat member 32 is formed by molding a sealing member having rubber elasticity to have a discoid shape. Thus, need of processing performed on the components having been formed is dropped. Thus, these components can be formed at lower costs than in the case where, for example, these components are separately machined. Furthermore, as will be clarified from the following description of the structures of these components, assembly of these components can be mechanically performed. Thus, the manufacturing costs can be reduced also in this regard.

The structure of the valve member 3 is described in more detail as follows. That is, the discoid seat member 32 has a main seat surface 32*a*, a discharge seat surface 32*b*, and communication holes 32*c*. The main seat surface 32*a* is formed at a portion facing the main valve seat 2 and brought into contact with and separating from the main valve seat 2. The discharge seat surface 32*b* is formed at a portion facing the end surface 5*a* of the discharge channel 6 of the valve opening rod 5, and the end surface 5*a* is brought into contact with or separated from the discharge seat surface 32*b*. The communication holes 32*c* are provided so as to allow the through hole 31*a* of the valve member main body 31 to be open at a region between the main seat surface 32*a* and the discharge seat surface 32*b*. The communication holes 32*c* are formed to have an arc shape in plan view at a position between the main valve seat 2 and the end surface 5*a* of the discharge channel 6 of the rod 5, which are concentric with each other.

The seat member 32 is in contact with and secured to the main valve seat facing surface 31*b* of the valve member main body 31. Projections 31*c* are provided on this main valve seat facing surface 31*b* of the valve member main body 31. The projections 31*c* are inserted into the communication holes 32*c* provided corresponding to the region between the main seat surface 32*a* and the discharge seat surface 32*b* of the seat member 32, thereby positioning the seat member 32 and suppressing narrowing of the communication holes 32*c* by deformation. The projections 31*c* have an arc shape in plan view similar to that of the communication holes 32*c* of the seat member 32. The shapes of the projections 31*c* on outer surface sides are preferably arc surfaces 31*d* in contact with inner surfaces of the communication holes 32*c* on an outer circumferential side so that the seat member 32 is stably positioned. Projecting portions 31*e* are preferably formed on inner side surface sides of the projections 31*c* so as to set gaps between the inner wall surfaces of the communication holes 32*c* and the projections 31*c*, so that the narrowing of the communication holes 32*c* is suppressed.

Furthermore, grooves 31*f* are formed in the main valve seat facing surface 31*b* of the valve member main body 31 so that the communication holes 32*c* communicate with the through hole 31*a* through the grooves 31*f*.

The seat member 32, which has at its central portion a conical hole 32*d* having a diameter reducing toward the valve member main body 31 side, is brought into contact with the main valve seat facing surface 31*b* of the valve member main body 31 in a way as described above. Then, the central portion of the seat member 32 is secured to the valve member main body 31 by airtightly fitting the securing member 33, which has a head portion having a shape similar to that of the conical hole 32*d*, into the conical hole 32*d*, and a tip-end hook portion 33*a* of the securing member 33 is press-fitted into and locked by a step portion inside the through hole 31*a* of the valve member main body 31.

The pressing frame 34, which holds the circumference of the seat member 32 on the valve member main body 31, has a locking edge portion 34*a*, which is locked at the circumference of the seat member 32 so as to clamp the seat member 32 between the locking edge portion 34a and the circumference of the valve member main body 31. A circumferential edge lower portion 34b of the pressing frame 34, which is in contact with the circumferential edge of the valve member main body 31, is secured to the circumferential edge of the valve member main body 31 by welding or bonding.

Figure 5:
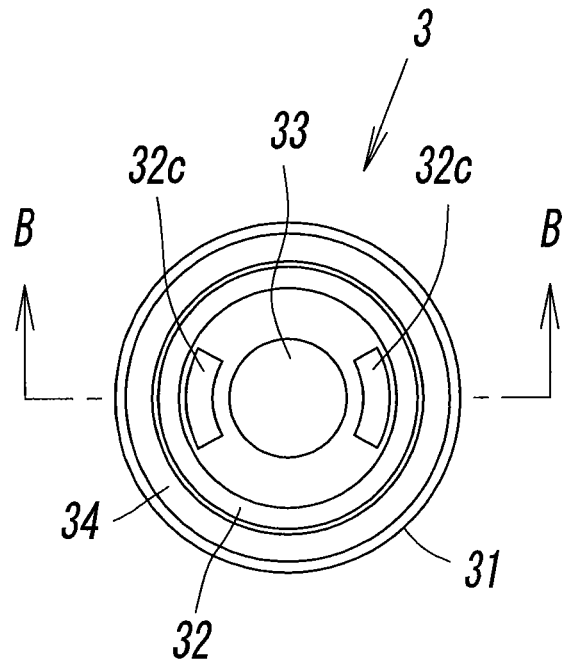
FIG. 5 is a plan view illustrating a variant of the valve member.
Figure 6:
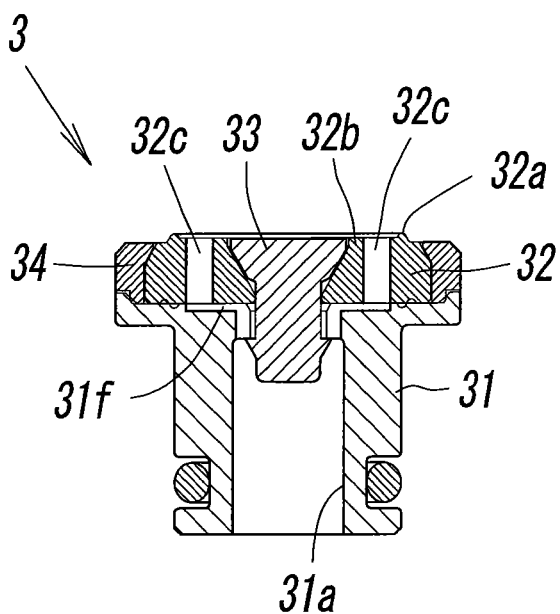
FIG. 6 is a sectional view of the valve member illustrated in FIG. 5 taken along a line B-B in FIG. 5.
Figure 7:
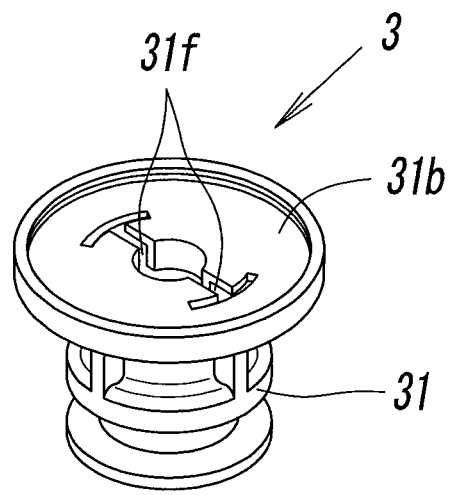
FIG. 7 is a perspective view of a valve member main body of this valve member.
Figure 8:
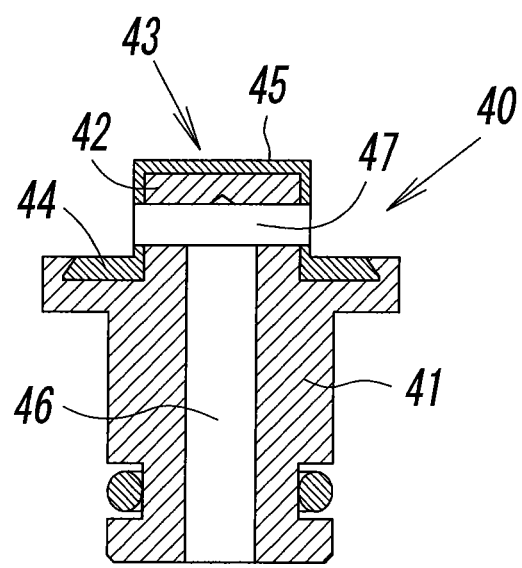
FIG. 8 is a sectional view of a known valve member used in a valve body of the same type as the valve body of the normally closed three-port valve according to the present invention.

FIGS. 5 to 7 illustrate an example of an alternative structure of the valve member 3. Compared to the valve member illustrated in FIGS. 1 to 4, the projections 31c projecting from the main valve seat facing surface 31b of the valve member main body 31 are omitted, and the grooves 31f, which allow the communication holes 32c provided corresponding to the region between the main seat surface 32a and the discharge seat surface 32b of the seat member 32 to communicate with the through hole 31a of the valve member main body 31, are formed in the valve member main body 31.

In this case, it is sufficient that the seat member 32 be more reliably secured to the valve member main body 31 by the securing member 33 and the pressing frame 34.

In this example structure, parts of the structure other than the above description and operations are not different from the case of the valve member having been described with reference to FIGS. 1 to 4. Thus, the main parts are denoted by the same reference numerals and description thereof is omitted here.

In the normally closed three-port valve structured as described above, when the tip end of the rod 5 is pressed for opening the valve, the end surface 5a of the discharge channel 6 of the rod 5 is brought into pressure contact with the discharge seat surface 32b of the valve member 3 so as to close the discharge channel 6 of the rod, and the valve member 3 is pressed by the rod 5 against an urging force of the valve member return spring 4. Thus, the valve seat is opened. As a result, the pressure air flows from the supply port P to the output port A. Also at the time of this opening of the valve, the fluid pressure on the output port A side is introduced into the back pressure chamber 8 formed at the back of the valve member 3 through the vent hole 9 provided in the valve member 3. Thus, the fluid pressures acting on the front and back surfaces of the valve member 3 are balanced. As long as the inner end surface 5a of the rod 5 is in pressure contact with a discharge seat portion of the valve member 3, the discharge channel 6 open to the outside through the rod 5 is closed.

When a pressing force for opening the valve applied to the rod 5 is lost, the rod 5 is returned by the urging force of the rod return spring 18. Since the fluid pressures acting on the front and back surfaces of the valve member 3 are balanced as described above, the valve member 3 can be returned by a small urging force of the valve member return spring 4. Thus, even when the urging force of the valve member return spring 4 is small, the main seat surface 32a of the valve member 3 can be brought into contact with the main valve seat 2 and can close the main valve seat 2. It is sufficient that the pressing force to press the rod 5 for opening the valve be a force that against the urging forces of the rod return spring 18 and the valve member return spring 4.

When the pressing force applied to the rod 5 for opening the valve is lost, the rod 5 returns to the original valve close position by the urging force of the rod return spring 18. Accordingly, the end surface 5a of the rod 5 is separated from the discharge seat surface 32b of the valve member 3. Thus, the pressure air on the output port A side is discharged from the tip end of the rod 5 through the discharge channel 6 of the rod 5. At the same time, the fluid pressure having flowed into the back pressure chamber 8 formed at the back of the valve member 3 is also discharged from the vent hole 9 of the valve member 3 to the outside through the discharge channel 6 of the rod 5. Thus, the pressure in the back pressure chamber 8 becomes the atmospheric pressure.

REFERENCE SIGNS LIST 1 valve body
2 main valve seat
3 valve member
4 return spring
5 rod
6 discharge channel
8 back pressure chamber
9 vent hole
31 valve member main body
31a through hole
31b main valve seat facing surface
32 seat member
32a main seat surface
32b discharge seat surface
32c communication hole
33 securing member
34 pressing frame
P supply port
A output port
R discharge port

The invention claimed is:

1. A normally closed three-port valve includes a valve member urged in a valve closing direction by a return spring from a supply port side toward a main valve seat provided in a valve body between an output port and the supply port; a discharge channel provided into a valve opening rod which makes the main valve seat open by applying a valve opening operating force to the valve member, and the discharge channel closed by bringing the rod into contact with a discharge seat surface on the valve member; and a balance mechanism configured to balance the fluid pressure acting on front and back surfaces of the valve member by providing a vent hole in the valve member when the valve member is at a valve open position, and the vent hole allowing a back pressure chamber of a back of the valve member to communicate with a channel for a main fluid on the output port side,
wherein the valve member comprises a valve member main body that is slidably held in a contacting and separating direction relative to the main valve seat and has a through hole formed therein to form the vent hole, a seat member that is formed of a discoid sealing member having rubber elasticity, that brings into contact with a main valve seat facing surface of the valve member main body, that has a main seat surface at a portion facing the main valve seat, that has the discharge seat surface formed at a portion facing an end surface of the discharge channel of the valve opening rod, and that has a communication hole allowing the through hole of the valve member main body to be open at a region between the main seat surface and the discharge seat surface, a securing member that is airtightly fitted into a central portion of the seat member so that a tip end thereof is locked in the valve member main body so as to secure the seat member to the valve member main body, and a pressing frame that holds a circumference of the seat member on the valve member main body, and wherein respective members are formed by molding.

2. The normally closed three-port valve according to claim 1, wherein the pressing frame that holds the circumference of the seat member on the valve member main body has a locking edge portion locked at the circumference of the seat member and the locking edge portion which clamps the seat member between the circumference of the valve member main body and the locking edge portion, and wherein a circumferential edge lower portion of the pressing frame, which is in contact with a circumferential edge of the valve member main body, is secured to the valve member main body by welding or bonding.

3. The normally closed three-port valve according to claim 1, wherein a tip end of the valve opening rod applying the valve opening operating force to the valve member projects from the valve body to an outside, so that an outer end of the rod serves as a contacting end that is in mechanical contact with a valve operating mechanism.

4. The normally closed three-port valve according to claim 1, wherein, in the main valve seat facing surface of the valve member main body, a groove that allows the communication hole provided corresponding to the region between the main seat surface and the discharge seat surface of the seat member of the valve member to communicate with the through hole of the valve member main body.

5. The normally closed three-port valve according to claim 1, wherein, in the main valve seat facing surface of the valve member main body, a projection is inserted into the communication hole provided corresponding to the region between the main seat surface and the discharge seat surface of the seat member of the valve member and positions the seat member, and the projection suppresses narrowing of the communication hole due to deformation.

* * * * *